United States Patent [19]
Bierlein et al.

[11] Patent Number: 5,146,533
[45] Date of Patent: Sep. 8, 1992

[54] ION EXCHANGED CRYSTALLINE WAVEGUIDES AND PROCESSES FOR THEIR PREPARATION

[75] Inventors: John D. Bierlein; August Ferretti, both of Wilmington; Mark G. Roelofs, Hockessin, all of Del.

[73] Assignee: E. I. Du Pont de Nemours and Company, Wilmington, Del.

[21] Appl. No.: 738,775

[22] Filed: Aug. 1, 1991

[51] Int. Cl.$^5$ ................................................. G02B 6/10
[52] U.S. Cl. ................................. 385/141; 385/131; 156/624
[58] Field of Search ..... 350/96.31, 96.32, 96.33 96.34; 385/131, 141, 142, 143, 144, 145; 156/624

[56] References Cited

U.S. PATENT DOCUMENTS

| | | | |
|---|---|---|---|
| 3,949,323 | 4/1976 | Bierlein et al. | 332/751 |
| 4,231,838 | 11/1980 | Gier | 156/600 |
| 4,305,778 | 12/1981 | Gier | 156/623 |
| 4,740,265 | 4/1988 | Bierlein et al. | 156/624 |
| 4,766,954 | 8/1988 | Bierlein et al. | 156/624 |
| 5,028,107 | 7/1991 | Bierlein et al. | 350/96.12 |

OTHER PUBLICATIONS

A. Yariv, et al., "Optical Waves in Crystals", pp. 1–37 (1984).
R. G. Hunsperger, "Integrated Optics: Theory and Technology", pp. 16–29 and 38–43 (1982).
M. Eddy, et al., Inorg. Chem. 27, pp. 1856–1858 (1988).
R. H. Jarman, Solid State Ionics 32/33, pp. 45–49 (1989).
K. K. Wong, SPIE vol. 993, pp. 13–25 (1988).
R. K. Tien, et al., Appl. Phys. Lett. 14, pp. 291–294, (1969).
J. M. White, et al., Appl. Optics 15, pp. 151–155 (1976).
Handbook of Preparative Inorganic Chemistry, G. Brauer, Ed., Academic Press, p. 1071 (1965).

Primary Examiner—John D. Lee
Assistant Examiner—Phan T. Heartney

[57] ABSTRACT

There is disclosed an optical waveguide comprising a $K_{1-x}Rb_xTiOMO_4$ single crystal substrate, wherein x is from 0 to 1 and M is P or As, having at least one optically smooth surface wherein sufficient $K^+$ and/or $Rb^+$ have been replaced by ions selected from at least one of $H^+$ and $NH_4^+$ and, optionally, at least one monovalent ion selected from $Rb^+$, $Cs^+$, $Tl^+$, and/or at least one divalent ion selected from $Ba^{+2}$, $Sr^{+2}$, $Ca^{+2}$ and $Pb^{+2}$ change the surface index of refraction at least about 0.00025 with respect to the index of refraction of the single crystal substrate. One process disclosed for producing an optical waveguide comprises the steps of contacting at least one optically smooth surface of a single crystal of $K_{1-x}Rb_xTiOMO_4$ with an ion exchange medium capable of supplying said replacement ions for sufficient time at a temperature of from about 100° C. to about 600° C., and cooling the resulting crystal. Another process disclosed for producing an optical waveguide comprises the step of applying a DC voltage of from about 20 V per cm of crystal thickness to about 2000 V per cam of crystal thickness across the z-surfaces of a z-cut $K_{1-x}Rb_xTiOMO_4$ single crystal, in the presence of a proton source for sufficient time at a temperature of from about −40° C. to 400° C. A nonlinear optic device using the optical waveguide of the invention is also disclosed.

16 Claims, 1 Drawing Sheet ns, 5,146,533

ION EXCHANGED CRYSTALLINE WAVEGUIDES AND PROCESSES FOR THEIR PREPARATION

FIELD OF THE INVENTION

This invention relates to optical waveguides and processes for making them.

BACKGROUND OF THE INVENTION

For slab or channel waveguides, it is necessary that the material through which the light is propagated have an index of refraction larger than that of surrounding media However, in order that the light is propagated along and is confined to the slab or channel material there are more stringent requirements. Generally, modes of propagation are classified into two kinds according to the orientation of the field vectors those with transverse electric fields (TE modes) and those with transverse magnetic fields (TM modes). The solutions to Maxwell's equations for these modes for a slab waveguide are well-known (see e.g. "Optical Waves in Crystals", Yariv, et al., John Wiley & Sons, New York, Chapter 11 (1984); or "Integrated Optics: Theory and Technology", Hunsperger Springer-Verlag, Berlin 16-37 (1982). The number of such confined modes depends on the frequency of the light wave, the depth of the slab, and the indices of refraction of the three media involved, i.e., that of the substrate or plate material $n_s$, that of the slab waveguide material, $n_s + \Delta n$, and that of the material above the top surface of the slab waveguide, $n_a$. For a given frequency, the number of confined modes increases with increasing slab depth or with increasing index of refraction of the slab (i.e., with increasing $\Delta n$). For an extremely thin slab or an extremely small $\Delta n$, no mode is confined. As the depth of the slab and/or $\Delta n$ is increased, one mode becomes confined, then another, etc.

The solutions of Maxwell's equations for confined modes for a channel waveguide are more complicated than for a slab waveguide. For this reason, only approximate solutions have been obtained (see "Integrated Optics: Theory and Technology", Hunsperger, Springer-Verlag, Berlin, 38-43 (1982)). For a given value of $\Delta n$, there are certain minimum values for the depth and width of the channel in order for the channel to be able to confine a mode. These depth and width values are not independent, i.e., to confine a given mode, wider channels can be less deep while narrower channels require a greater depth. Typically, the depths and widths of approximately square channel waveguides are several times the depth of a slab waveguide. For both slab and channel waveguides, the index of refraction must be large enough so that at least one mode is confined.

Another more recently developed form of a waveguide involves periodic modulation of the refractive index of the waveguide surface, such as that described in U.S. Pat. No. 5,028,107.

There has been considerable interest in providing crystals suitable for use in the products of optical devices. Potassium Titanyl Phosphate (i.e., KTP) and certain analogs thereof are of particular note. For example, U.S. Pat. No. 3,949,323 discloses crystals of compounds having the formula MTiO(XO$_4$), wherein M is at least one of K, Rb, Tl, or NH$_4$ and X is at least one of P or As and wherein X is P when M is NH$_4$ and nonlinear optical devices and electro-optic modulators which use such crystals. U.S. Pat. No. 4,231,838 discloses a process for the manufacture of single crystals of MTiOXO$_4$, wherein M is K, Rb or Tl and X is P or As, of optical quality and of sufficient size for use in nonlinear optical devices, said process comprising the steps of heating certain starting ingredients (chosen to be within the region of a ternary phase diagram in which the desired crystal MTiOXO$_4$ product is the only stable solid phase) to produce MTIOXO$_4$, and then controllably cooling to crystallize the desired product. Crystals which have mixtures of elements for M and/or X can be grown by the process. U.S. Pat. No. 4,305,778 discloses a hydrothermal process for growing single crystals of MTiOXO$_4$, wherein M is K or Rb and X is P or As, said process involving using as a mineralizing solution an aqueous solution of a glass defined by specified portions of the ternary diagrams for the selected M$_2$O/X$_2$O$_5$/(TiO$_2$)$_2$ system.

Methods of modifying KTP and certain analogs thereof to produce optical waveguides have also been studied. For example, U.S. Pat. No. 4,740,265 and U.S. Pat. No. 4,766,954 disclose a process for producing an optical waveguide comprising contacting at least one optically smooth surface of a single crystal of a K$_{1-x}$Rb$_x$TiOMO$_4$ (wherein x is from 0 to 1 and M is P or As) with a specified molten salt of at least one of Rb, Cs, and Tl at a temperature of from about 200° C. to about 600° C. for a time sufficient to increase the surface index of refraction at least about 0.00025 with respect to the index of refraction of the starting crystal, and cooling the resulting crystal. U.S. Pat. No. 5,028,107 describes periodically modifying crystals to produce a waveguide useful for wavelength conversion.

M. M. Eddy et al., Inorg. Chem. 27, 1856 (1988) describes preparation and some properties of compounds of the formula NH$_4$TiOPO$_4$ (NTP), NH$_4$H(TiOPO$_4$)$_2$ (NHTP), H$_3$ONH$_4$ (TiOPO$_4$)$_2$ (NOTP), and H$_2$(TiOPO$_4$)$_2$ in powdered form.

R. H. Jarman, Solid State Ionics 32/33, 45 (1989) describes ion exchange reactions using KTiOPO$_4$ and molten salts containing sodium, lithium and hydrogen ions. Partial ion-exchange of KTiOPO$_4$ in excess molten NaNO$_3$ was achieved. In contrast, Li salts under the same conditions did not affect ion-exchange, but instead caused decomposition of the KTP latice; and proton exchange in inorganic or organic media was not achieved.

Other crystal systems have also been studied in connection with optical waveguides. For example, Wong, SPIE Vol 993 Integrated Optical Circuit Engineering VI, pages 13-25 (1988) reviews a proton exchange processes for producing proton exchanged LiNbO$_3$ and LiTaO$_3$ waveguides.

SUMMARY OF THE INVENTION

The present invention provides an optical waveguide comprising a K$_{1-x}$Rb$_x$TiOMO$_4$ single crystal substrate, wherein x is from 0 to 1 and M is P or As, having at least one optically smooth surface wherein sufficient K$^+$ and/or Rb$^+$ have been replaced by ions selected from at least one of H$^+$ and NH$_4^+$ and, optionally, at least one monovalent ion selected from Rb$^+$, Cs$^+$, Tl$^+$, and/or at least one divalent ion selected from Ba$^{+2}$, Sr$^{+2}$, Ca$^{+2}$ and Pb$^{+2}$ to change the surface index of refraction at least about 0.00025 with respect to the index of refraction of the single crystal substrate. The waveguide consists of region(s) in the single crystal substrate where K$^+$ and/or Rb$^+$ have been replaced with ions chosen from at least one of $H^+$ and $NH_4^+$, and optionally at least one monovalent ion selected from $Rb^+$, $Cs^+$, $Tl^+$, and/or at least one divalent ion selected from $Ba^{2+}$, $Sr^{2+}$, $Ca^{2+}$ and $Pb^{+2}$. These waveguides may be used for various optical applications such as wavelength conversion and electrooptic modulation. The invention also provides nonlinear optic devices which are characterized by employing as an optical element, the optical waveguide of this invention. A process for producing an optical waveguide in accordance with this invention comprises the steps of contacting at least one optically smooth surface of a single crystal of $K_{1-x}Rb_xTiOMO_4$ wherein x is from 0 to 1 and M is P or As, with an ion exchange medium, conveniently a liquid, capable of supplying ions including at least one of $H^+$ or $NH_4^+$ and, optionally, at least one monovalent ion selected from $Rb^+$, $Cs^+$, $Tl^+$, and/or at least one divalent ion selected from $Ba^{+2}$, $Sr^{+2}$, $Ca^{+2}$ and $Pb^{+2}$ at a temperature of from about 100° C. to about 600° C. for a time sufficient to increase the surface index of refraction at least about 0.00025 with respect to the index of refraction of the single crystal; and cooling the resulting crystal.

Another process for producing an optical waveguide in accordance with this invention comprises the step of applying a DC voltage of from about 20 V per cm of crystal thickness to about 2000 V per cm of crystal thickness across the z-surfaces of a z-cut $K_{1-x}Rb_x$TiOMO$_4$ single crystal, wherein x is from 0 to 1 and M is P or As, in the presence of a proton source at a temperature of from about $-40°$ C. to 400° C. for a time sufficient to raise the index of refraction underneath the anode by at least 0.00025 with respect to the index of refraction of the single crystal by replacing $K^+$ and/or $Rb^+$ of said single crystal with $H^+$.

The relative amounts of $NH_4^+$ and $H^+$ in both processes may be adjusted by heating the guides in the presence of specified partial pressures of ammonia.

DETAILED DESCRIPTION OF THE INVENTION

Figure 1:
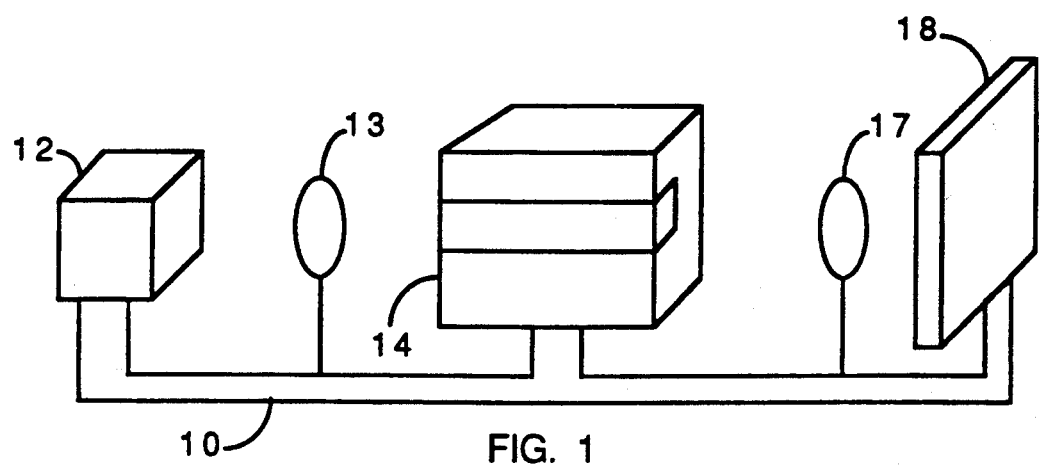
FIG. 1 is a schematic drawing of an apparatus for wavelength conversion in accordance with this invention.

This invention provides an optical waveguide wherein a $K_{1-x}Rb_xTiOMO_4$ single crystal substrate (wherein x is from 0 to 1 and M is P or As) is modified by replacing sufficient monovalent cations (e.g., $K^+$ or $Rb^+$) in at least one region of the crystal to change the surface index of refraction at least 0.00025 with respect to the unmodified single crystal (i.e., the substrate). In accordance with this invention the monovalent cations are at least partially replaced by $H^+$ and/or $NH_4^+$. Optionally, a portion of the substrate cations may also be replaced by $Rb^+$, $Cs^+$ and/or $Tl^+$ ions. Also, a portion of the substrate cations may be replaced by $Ba^{+2}$, $Sr^{+2}$, $Ca^{+2}$ and/or $Pb^{+2}$ ions. Waveguides provided in accordance with this invention may be in a number of forms, including channel waveguides and slab waveguides. Periodically modulated guides such as those disclosed in U.S. Pat. No. 5,028,107 (but using $H^+$ and/or $NH_4^+$ as exchange ions) can also be produced in accordance with the specifications taught therein by masking the single crystal substrate in an appropriate predetermined pattern prior to subjection of the single crystal substrate to the ion exchange medium.

Suitable single crystal substrates of the formula $K_{1-x}Rb_xTiOMO_4$ can be prepared by known processes (see, for example, U.S. Pat. Nos. 3,949,323, 4,231,838 and 4,305,778). The preferred single crystal substrate is $KTiOPO_4$ (i.e., KTP).

The ion exchange medium useful in the practice of this invention is preferably in the form of a liquid. The characteristics of the liquid to be used in the process are (a) that it should be substantially stable at a temperature sufficient to cause exchange in the crystal, (b) that is should not grossly dissolve or etch the surface of the single crystal substrate, (c) that it have some solubility for either $H^+$ or $NH_4^+$, and (d) that it be capable of dissolving, i.e., removing from surface, the potassium or rubidium ions from the single crystal substrate.

Preferred ion exchange liquids for introducing $NH_4^+$ into the single crystal substrate include liquid $NH_4Cl$ and liquid $NH_4NO_3$. Preferred ion exchange liquids for introducing $H^+$ into the single crystal substrate include liquid benzoic and phthalic acids; liquid chlorides such as $GaCl_3$, $ZnCl_2$, $BiCl_3$, $NH_4Cl$; liquid $NH_4NO_3$; and liquid $RbCF_3SO_3$. In most cases when salts are used a proton source (e.g., water) is also present. For example, protons may be derived from water present in salts before melting, water adsorbed from the atmosphere by the molten salt, or from hydrochloric acid deliberately introduced into the melt. In the case of benzoic and phthalic acids, protons for exchange are derived directly from the acidic functionality of the organic compound, or by bubbling the melt with hydrochloric acid vapor. When $H^+$ is the desired exchange ion, the preferred liquid is $RbCl/ZnCl_2$ which has HCl dissolved in it. When $NH_4^+$ is the desired exchange ion, the preferred liquid is $NH_4Cl/ZnCl_2$ which has ammonia bubbled through it.

The monovalent ions $Cs^+$, $Tl^+$, and $Rb^+$ may also be included in the ion exchange medium to give mixed waveguides Divalent ions $Ba^{2+}$, $Sr^{2+}$, $Ca^{2+}$ and $Pb^{2+}$ can also be added to the ion exchange medium to accelerate the rate of waveguide formation, provide for domain inversion or allow operation at a lower temperature. Accordingly, a process for producing an optical waveguide is provided in accordance with this invention which comprises the steps of contacting at least one optically smooth surface of a single crystal of $K_{1-x}Rb_xTiOMO_4$ wherein x is from 0 to 1 and M is P or As, with an ion exchange medium, capable of supplying ions including at least one of $H^+$ or $NH_4^+$ and, optionally, at least one monovalent ion selected from $Rb^+$, $Cs^+$, $Tl^+$, and/or at least one divalent ion selected from $Ba^{+2}$, $Sr^{+2}$, $Ca^{+2}$ and $Pb^{+2}$, at a temperature of from about 100° C. to about 600° C. for a time sufficient to increase the surface index of refraction at least about 0.00025 with respect to the index of refraction of the single crystal by replacing $K^+$ and/or $Rb^+$ of said single crystal with said ions supplied by the exchange medium and cooling the resulting crystal.

Since molten metal chlorides are commonly found to contain dissolved water in unpredictable amounts, it may be preferable to eliminate the water to exercise more exact control over the amount of proton source present during the process of this invention. Furthermore, the water may hydrolyze the metal chloride, leading to the production of hydrochloric acid and metal oxide or metal hydroxide. One method of removing this water is to bubble the melt with relative dry hydrogen chloride; this reverses the hydrolysis reaction, regenerating water and metal chloride. The water inevitably has some vapor pressure and is slowly removed from the solution along with the flow of hydrogen chloride. If such a dry, HCl-saturated melt is now bubbled with dry nitrogen, a melt containing relatively less amount of water and protons results. The metal chloride melt treated in this way can then be used in the process of this invention with a controlled amount of proton source.

Another process for producing an optical waveguide is provided in accordance with this invention which comprises the step of applying a DC voltage of from about 20 V per cm of crystal thickness to about 2000 V per cm of crystal thickness across the z-surfaces of a z-cut $K_{1-x}Rb_xTiOMO_4$ single crystal, wherein x is from 0 to 1 and M is P or As, in the presence of a proton source at a temperature of from about $-40°$ C. to $400°$ C. for a time sufficient to raise the index of refraction underneath the anode by at least 0.00025 with respect to the index of refraction of the single crystal by replacing $K^+$ and/or $Rb^+$ of said single crystal with $H^+$.

For this alternative process for preparing the waveguides of this invention, a z-cut single crystal of $K_{1-x}Rb_xTiOMO_4$, preferably $KTiOPO_4$, may be provided with conductive electrodes (preferably sputtered gold or sputtered gold-palladium) on both z surfaces. A DC voltage is applied across the electrodes to give a ratio of applied voltage to crystal thickness (measured along the z-axis) from about 20 V/cm to about 2000 V/cm at a temperature from about $-40°$ C. to $400°$ C. for a time sufficient to raise the index of refraction underneath the anode by at least 0.00025. Preferably one uses a ratio of voltage to crystal thickness of about 300 V/cm at a temperature of about $200°$ C. The electrodes may be mechanically removed by light abrasion and rubbing or can be removed by chemical means. The optical waveguide is formed underneath the anode, or positive electrode. The source of protons for these electric field-induced guides is preferably the ambient water in the atmosphere, water explicitly added to the atmosphere during the electric field treatment, or protons already present in the crystal from its growth. The crystals may also be damaged by a darkening phenomena which initially begins at the cathode. The treatment time and temperature should be reduced if such electrochromic effect is damaging the crystal.

When an $NH_4^+$-exchanged $K_{1-x}Rb_xTiOMO_4$ waveguide of the invention is heated in the presence of a low partial pressure of ammonia (e.g., air or vacuum), ammonia may be lost with the formation of a $H^+$-exchanged waveguide. Conversely, when a $H^+$-exchanged waveguide is heated in the presence of a large partial pressure of ammonia (e.g., 1 atm), the protons may be reammoniated to form an $NH_4^+$-exchanged guide. In the case of reammoniation, the wave guide often diffuses to a greater depth; the resulting index of refraction increase is lower, but the conversion of $H^+$ to $NH_4^+$ leads to a lower value of the relative birefringence $(\Delta n_{TMO} - \Delta n_{TEO})\Delta n_{TMO}$. See Examples 7, 8, 10 and 10A below In addition to characterization of these changes through measurement of the effective mode indices, the process may also be observed through infrared light absorption. The ammonium exchanged guides show absorptions bands at 3175 cm$^{-1}$ and 3019 cm$^{-1}$ due to ammonium ion. Deammoniation by heating in a low partial pressure causes a decrease in the intensity of the ammonium bands, and an increase in the OH absorption bands near 3587 cm$^{-1}$ and 3566 cm$^{-1}$. Reammoniation by exposure to ammonia gas causes a decrease in the OH bands, and the reappearance of absorption bands due to ammonium ion.

If too deep excessive a diffusion of protons alone is created, the crystal may crack. The preferred depth of exchange is 0.5 to about 2.5 $\mu$m.

The change in refractive index using ammonium exchange and/or proton exchange is different than the change in refractive index using comparable amount of rubidium, cesium and/or thalium exchange. The profiles in depth of the index of refraction arising from protons are quite different from the depth profile arising from ammonium or rubidium exchange. The latter two ions give a concave distribution which can be fit to an error or exponential function. Protons form a more step like index step, and a depth in the substrate is reached where the proton concentration drops very rapidly from a high and relatively uniform value. In addition the increase in refractive index along the z-axis achieved by proton exchange is generally greater than the increase in refractive index normal to the z-axis (i.e., along the x and y axes).

Proton exchange also differs from Rb exchange in that the proton exchange can diffuse along the y and x directions more easily than can the Rb exchange. Consequently, there can be 'undercutting' of the mask in a proton exchange, and the sidewalls need not be so straight. Moreover, waveguides can be more easily fabricated from x and y cut crystals using proton exchange.

The waveguide of this invention can be used in the appropriate form (e.g., channel, slab, or periodic) as the optical element in a wide variety of nonlinear optic devices. A specific employment of a waveguide in accordance with this invention is illustrated by reference to the apparatus (10) shown in FIG. 1 wherein optical waves emitted by laser (12) at one wavelength may be used to generate waves at another wavelength. Lens (13) is used to focus the optical waves emitted by laser (12) into a waveguide (14) constructed in accordance with this invention. Wavelength conversion occurs within the waveguide (14) and a second lens (17) is provided to collimate the optical waves emerging from the waveguide. A filter (18) is provided in the arrangement shown to filter out the remaining optical waves which have the wavelength of the emitted waves, while allowing optical waves of the desired wavelength which were generated within the waveguide (14) to pass through. Thus, for example, if laser (12) is a Nd YAG laser used to generate polarized light at wavelength 1.06 $\mu$m, and the waveguide (14) is constructed in accordance with this invention for second harmonic generation using such incident light, the filter (18) would be adapted to allow optical waves of wavelength 0.53 $\mu$m to pass through while optical waves of wavelength 1.06 $\mu$m are filtered from the collimated beam which emerges from the waveguide. A device incorporating the apparatus of FIG. 1 (i.e., the laser (12), the waveguide (14), the filter (18), and the lenses (13) and (17)) is considered to be an article within the scope of this invention, as well as the waveguides themselves and the processes for preparation thereof.

Practice of the invention will become further apparent from the following non-limiting examples.

EXAMPLES

The invention is further illustrated by the following examples in which all percentages and parts are on a mole bases and temperatures are in degrees Celsius unless otherwise stated. Unless stated otherwise, the effective indices of refraction of the slab waveguides are determined by the method of Tien et al., Applied Physics Letters 14, 291-294 (1969) by examining the samples for waveguiding by the m-line prism-layer coupler technique described in that article using a 45° -45° -90° rutile prism and a He-Ne laser. When several modes are present, an estimate of the index of refraction of the surface ($\Delta n$ surf.) and the depth profile of the index increase is made using the technique described in J. M. White, Appl. Optics, 15, 151 (1976). Waveguide thickness was determined optically for some examples by using a phase contrast microscope, a Zeiss Axiomat TM. Waveguide thicknesses measured optically correlate with those determined by the m-line prism-layer coupler technique. The $\Delta n$ for the zero order mode is listed for each example in Table 1 ($\Delta n$ O-order mode). Depths (d) are provided for some samples.

EXAMPLE 1

A molten salt bath was prepared by heating 50% $ZnCl_2$/50% RbCl in a platinum crucible at 350° C. for about 16 hours. A slab waveguide was prepared by immersing a $KTiOPO_4$ (KTP) crystal with a polished z-surface into the melt for 2 hours. The resulting crystal was cooled to room temperature, and then was washed with water to remove excess chloride salts.

The resulting waveguide was then examined by the m-line prism-layer coupler technique and 5 TE modes and 6 TM modes were observed. The resulting O-order $\Delta n$ is characteristic of proton exchange. The results are summarized in Table 1.

EXAMPLE 2

A z-cut KTP crystal had gold/palladium electrodes sputtered on to the z-surfaces. A D.C. electric field of 200 V was applied for 1 hour at 30° C. The electrodes were removed by light abrasion and rubbing. A slab waveguide was created on the anode surface, having 4 modes TE, 5 modes TM. The resulting O-order $\Delta n$ is characteristic of proton exchange.

EXAMPLE 3

A salt bath of 50% $NH_4Cl$/50% $ZnCl_2$ was prepared at 325° C. A slow flow of ammonia gas at 1 atm. pressure was bubbled through the melt for 16 hrs. Then a z-cut KTP crystal was immersed in the bath for 16 hours with continuing flow of ammonia, yielding a planar guide with $\Delta n_{TE}=0.046$ and $\Delta n_{TM}=0.040$. The birefringence is characteristic of an ammonium guide.

EXAMPLE 4

About 40 g of phthalic acid is placed in a glass tube which is lowered into a furnace held at 275° C. A mixture of 50 vol % HCl and 50% $N_2$ is bubbled through the melt at about 2.5 sccm for several hours. A z-cut KTP crystal is immersed in the melt for 270 minutes, removed, cleaned, and prism coupled. Three modes each TE and TM are obtained, the induced birefringence being characteristic of a proton guide.

EXAMPLE 5

A salt bath of about 0.035 moles total containing 98% $BiCl_3$/2% KCl was prepared at 300° C. and a mixture of 50% HCl/50% $N_2$ was bubbled through the melt. A z-cut KTP crystal was immersed in the bath for 30 minutes. The crystal was removed and cleaned, and prism coupled-indicating at least one mode TM. The crystal surface is also etched and made slightly tan color. The birefringence is considered characteristic of proton exchange.

EXAMPLE 6

A salt bath containing 50% RbCl/50% $ZnCl_2$ was prepared at 300° C. An x-cut KTP crystal was immersed in the bath for 120 minutes, removed, cleaned, and prism coupled. Two modes TE and two modes TM were observed, with $\Delta n_{TE}=\Delta n_z=0.025$ and $\Delta n_{TM}=\Delta n_x=0.017$. The birefringence is characteristic of the presence of protons in the guide, with $\Delta n_z > \Delta n_y$, $\Delta n_x$.

EXAMPLE 7

A z-cut KTP crystal was immersed for 300 minutes in a salt bath prepared by heating ammonium nitrate in a covered crucible at 200° C. After removal and cleaning, the crystal showed one mode each TE and TM, with $\Delta n_{TE}=0.0009$ and $\Delta n_{TM}=0.006$. The birefringence is characteristic of ammonium exchange.

EXAMPLE 8

The sample from Example 7 was annealed at 250° C. in air for 60 minutes. The result was a slab guide with one mode each TE and TM, but $\Delta n_{TE}=0.012$ and $\Delta n_{TM}=0.032$. The annealing resulted in loss of ammonia from ammonium ions, resulting in a proton guide with its characteristic increased birefringence.

EXAMPLE 9

A melt was prepared by placing solid $GaCl_3$ into a glass tube and heating to 140° C. It was held at 140° C. for several hours, and atmospheric moisture was allowed to come into contact with the liquid, A z-cut KTP sample was immersed in the bath for 4 hours. Upon removal, cooling, cleaning, and prism coupling, a slab waveguide resulted with 3 modes TM. The increase in the index along of $n_z$ is larger than that of $n_y$ or $n_x$, which is characteristic of proton exchange.

EXAMPLE 10

A melt of a total of about 0.035 moles of 50% $NH_4Cl$/50% $ZnCl_2$ was prepared at 300° C. in a covered quartz crucible. A z-cut KTP crystal is immersed in the melt for 15 minutes. After cleaning, prism coupling shows 4 modes each TE and TM. The size of the index increase and the birefringence is characteristic of a guide containing both ammonium and protons.

EXAMPLE 10A

The guide from Example 10 was ammoniated by placing the crystal in a Pyrex tube containing $NH_3$ at 1 atm. pressure for 60 min at 300° C. The surface index is reduced by ammoniation from $\Delta n_{TMsurf}=0.072$ to 0.045. The reduction in birefringence and lowering of the index of refraction is consistent with the transformation of a substantial fraction of the protons to ammonium ion.

EXAMPLE 11

A melt was prepared from about 18 g of $RbCF_3SO_3$ at 325° C. The melt was bubbled with a gas stream consisting of a mixture of 1 part $N_2$ which had been equilibrated with water at room temperature and 2 parts dry HCl. A z-cut KTP crystal was immersed in the melt for 10 minutes. After removal and prism coupling, 3 modes TE and 4 modes TM were observed.

$\Delta n_{TMO}-\Delta n_{TEO}$ is 0.023. The birefringence is characteristic of proton exchange.

EXAMPLE 12

About 37 g of benzoic acid was melted in a glass tube at 220° C. and held at this temperature for 1 day. A z-cut KTP crystal was immersed in the liquid for 3 days at 220° C. After removal and prism coupling, a slab waveguide was produced having 2 modes TE and 2 modes TM. The birefringence is characteristic of proton exchange.

EXAMPLE 13

A melt containing $RbCl/ZnCl_2/BaCl_2$ in the percentage 73/24/3 was prepared in a glass beaker at 300° C. A z-cut KTP crystal was immersed in the melt for 120 min, removed, cooled, cleaned. Prism coupling indicated 9 modes TE and 13 modes TM. The index-depth profile shows a region from the surface to a depth of about 4 mm which has a high induced birefringence ($\Delta n_{TM}-\Delta n_{TE}\sim 0.027$). This region is relatively rich in protons relative to rubidium. A 'tail' in the index-depth profile is a lower index region extending to a depth of about 20 μm characterized by a lower increase in index and less induced birefringence (both on an absolute and a relative basis). This region is thought to have more Rb relative to H. Comparison of this Example with that of Example 1 shows well the effect of the divalent ion Ba.

EXAMPLE 14

A melt of $ZnCl_2$ was prepared at 325° C. in a glass tube and a slow flow of HCl was bubbled through the melt for 20 hours. A z-cut KTP crystal was immersed in the bath for 20 min at 325° C. Upon removal and prism coupling, 4 modes TE and 5 modes TM were observed. This is an example of a waveguide in which most of the exchanged ions are protons. Its indices should be comparable with those of Examples 4, 5, and 8.

EXAMPLE 15

A z-cut KTP crystal, of thickness about 1 mm along the z direction had gold electrodes sputtered on to the z-surfaces. The crystal was grown by the hydrothermal method at a growth temperature of 600° C. The crystal was placed in a chamber at 200° C. A slow flow of air was bubbled through water at 95° C., and then through a heated tube into the chamber containing the crystal. This provided an atmosphere in the chamber having approximately 0.8 atm water vapor and the remainder air. The crystal was held in the chamber for 160 min., and then a DC voltage of 30 V was applied across the electrodes for 20 minutes. The crystal was immediately removed from the chamber, and the gold electrodes removed by light abrasion. A slab waveguide was created on the anode surface, having 1 mode each TE and TM. The birefringence is characteristic of proton exchange.

EXAMPLE 16

Crystalline Zn(OH)Cl was prepared as described in G. Brauer (ed.) Handbook of Preparative Inorganic Chemistry, Vol. 2 (2nd ed.), Academic Press (1965) p. 1071. A molten salt bat was prepared by heating $ZnCl_2/Zn(OH)Cl$ 95/5 to 300° C. in a crucible exposed to the air. A z-cut KTP crystal was immersed in the liquid for 15 min. Upon removal and prism coupling, 4 modes each TE and TM were observed. (This is an example of a proton guide where at least some protons are explicitly present in the formula of the starting melt.)

EXAMPLE 17

A melt of $NH_4NO_3$ was prepared at 200° C., and a z-cut KTP crystal was immersed in the melt for 420 min. After removal and prism coupling, no modes TE or TM were observed.

EXAMPLE 17A

The sample from Example 17 was placed on a hot plate in air for 20 min. at 250° C. One mode each TE and TM resulted. (This is an example of an ammonium diffusion which is too shallow to produce a guide. Upon deammoniation, a proton guide appears. So the deammoniation not only can convert one type into another, it can cause guiding where none existed.)

EXAMPLE 18

A mixture of $NH_4NO_3/Pb(NO_3)_2$ 70/30 was heated to 200° C. in a glass tube. A slurry formed, and presumably not all of the lead is dissolved. A z-cut KTP crystal was immersed in the melt for 1 hour. Upon removal and prism coupling, the guide gave 1 mode TE and one mode TM. The birefringence is characteristic of ammonium exchange.

EXAMPLE 19

A melt was prepared from $KCl/ZnCl_2$ 50/50 at 325° C. A mixture of $N_2/HCl$ 95/5 was bubbled through the melt. A z-cut KTP crystal was immersed in the melt for 15 min. Upon removal and prism coupling, 1 mode each TE and TM were observed. In comparison with Example 14, this is an example in which lower concentrations of HCl and the diluent KCl are used to control the waveguide to a shallower depth. The birefringence is characteristic of proton exchange.

TABLE 1

| Ex. | Liquid or Process Used | Temp. (°C.) | Time (min) | No., Type Modes Obsd. | $\Delta n$ 0-order mode | $\Delta n$ surf. | d(μm) |
|---|---|---|---|---|---|---|---|
| 1 | $RbCl/ZnCl_2$ 50/50 | 350 | 120 | 5 TE | 0.014 | 0.021 | 2.1 |
|   |   |   |   | 6 TM | 0.034 | 0.044 |   |
| 2 | D.C. electric field | 30 | ~60 | 4 TE | 0.049 |   |   |
|   |   |   |   | 5 TM | 0.053 |   |   |
| 3 | $NH_4Cl/ZnCl_2$ 50/50 with 1 atm $NH_3$ | 325 | 960 | 7 TE | 0.032 | 0.046 | 3.0 |
|   |   |   |   | 6 TM | 0.027 | 0.040 |   |
| 4 | Phthalic acid with 50/50 $HCl/N_2$ | 275 | 270 | 3 TE | 0.018 | 0.025 | 2.9 |
|   |   |   |   | 3 TM | 0.040 | 0.048 |   |
| 5 | $KCl/BiCl_3$ 2/98 with 50/50 $HCl/N_2$ | 300 | 30 | 0 TE | — |   |   |
|   |   |   |   | ≧1 TM | 0.033 |   |   |
| 6 | $RbCl/ZnCl_2$ 50/50 × surf. exchanged | 300 | 120 | 2 TE | 0.025 |   |   |
|   |   |   |   | 2 TM | 0.017 |   |   |

TABLE 1-continued

| Ex. | Liquid or Process Used | Temp. (°C.) | Time (min) | No., Type Modes Obsd. | Δn 0-order mode | Δn surf. | d(μm) |
|---|---|---|---|---|---|---|---|
| 7 | $NH_4NO_3$ | 200 | 300 | 1 TE | 0.0009 | | |
| | | | | 1 TM | 0.0006 | | |
| 8 | Crystal from Ex. 7 annealed in air | 250 (anneal) | 60 | 1 TE | 0.012 | | |
| | | | | 2 TM | 0.032 | | |
| 9 | $GaCl_3$ | 140 | 240 | 0 TE | — | | |
| | | | | 3 TM | 0.020 | 0.030 | |
| 10 | $NH_4Cl/ZnCl_2$ 50/50 | 300 | 15 | 4 TE | 0.038 | 0.047 | 2.8 |
| | | | | 4 TM | 0.059 | 0.072 | |
| 10A | Crystal from Ex. 10 after ammoniation | 300 | 60 | 5 TE | 0.027 | 0.034 | 3.0 |
| | | | | 5 TM | 0.036 | 0.045 | |
| 11 | $RbCF_3SO_3$ with HCl/wet $N_2$ | 325 | 10 | 3 TE | 0.039 | 0.048 | 2.4 |
| | | | | 4 TM | 0.062 | 0.073 | |
| 12 | Benzoic acid | 220 | 4320 | 2 TE | 0.019 | | |
| | | | | 2 TM | 0.041 | | |
| 13 | $RbCl/ZnCl_2/BaCl_2$ 73/24/3 | 300 | 120 | 9 TE | 0.019 | 0.022 | 3.3 |
| | | | | 13 TM | 0.046 | 0.053 | |
| 14 | $ZnCl_2$ with HCl | 325 | 20 | 4 TE | 0.020 | 0.025 | 4.5 |
| | | | | 5 TM | 0.040 | 0.047 | |
| 15 | Electric field with $H_2O$ vapor | 200 | 20 | 1 TE | 0.003 | | |
| | | | | 1 TM | 0.012 | | |
| 16 | $ZnCl_2/Zn(OH)Cl$ 95/5 | 300 | 15 | 4 TE | 0.023 | | |
| | | | | 4 TM | 0.047 | | |
| 17 | $NH_4NO_3$ | 200 | 420 | 0 TE | — | | |
| | | | | 0 TM | — | | |
| 17A | Crystal from Ex. 17 annealed in air | 250 | 20 | 1 TE | 0.0006 | | |
| | | | | 1 TM | 0.0082 | | |
| 18 | $NH_4NO_3/Pb(NO_3)_2$ 70/30 | 200 | 60 | 1 TE | 0.014 | | |
| | | | | 1 TM | 0.010 | | |
| 19 | $KCl/ZnCl_2$ | 325 | 15 | 1 TE | 0.0009 | | |
| | | | | 1 TM | 0.0059 | | |

Particular embodiments of the invention are included in the examples. Other embodiments will become apparent to those skilled in the art from a consideration of the specification or practice of the invention disclosed herein. IT is understood that modifications and variations may be practiced without departing from the spirit and scope of the novel concepts of this invention. It is further understood that the invention is not confined to the particular formulations and examples herein illustrated, but it embraces such modified forms thereof as come within the scope of the following claims.

What is claimed is:

1. An optical waveguide comprising: a $K_{1-x}Rb_xTiOMO_4$ single crystal substrate, wherein x is from 0 to 1 and M is P or As, having at least one optically smooth surface wherein sufficient $K^+$, $Rb^+$ or both $K^+$ and $Rb^+$ have been replaced by (i) ions selected from the group consisting of $H^+$ and $NH_4^+$ and, optionally, (ii) ions selected from the group consisting of $Rb^{30}$, $Cs^+$, $Tl^+$, $Ba^{+2}$, $Sr^{+2}$, $Ca^{+2}$ and $Pb^{+2}$, to change the surface index of refraction at least about 0.00025 with respect to the index of refraction of the single crystal substrate.

2. The optical waveguide of claim 1 wherein sufficient $K^+$, $Rb^+$ or both $K^+$ and $Rb^+$ ions of the substrate have been replaced by ions selected from the group consisting of $H^+$ and $NH_4^+$.

3. The optical waveguide of claim 1 wherein the substrate is KTP.

4. The optical waveguide of claim 3 wherein $K^+$ ions of the substrate have been replaced by (i) $H^+$ and (ii) $Rb^+$.

5. The optical waveguide of claim 3 wherein $K^+$ ions of the substrate have been replaced by at least one of $NH_4^+$ and $H^+$.

6. The optical waveguide of claim 3 wherein $K^+$ ions of the substrate have been replaced by $H^+$.

7. The optical waveguide of claim 3 wherein $K^+$ ions of the substrate have been replaced by $NH_4^+$.

8. The optical waveguide of claim 3 wherein $K^+$ ions of the substrate have been replaced by (i) $H^+$ and (ii) $Rb^+$ and $Ba^{2+}$.

9. The optical waveguide of claim 3 wherein $K^+$ ions of the substrate have been replaced by (i) at least one of $NH_4^+$ and $H^+$ and (ii) $Pb^{2+}$.

10. A nonlinear optic device characterized by employing as an optical element the optical waveguide of claim 1.

11. The nonlinear optic device of claim 10 wherein the optical waveguide is suitable for wavelength conversion.

12. The optical waveguide of claim 3 wherein $K^+$ ions of the substrate have been replaced by (i) $NH_4^+$ and (ii) $Ba^{+2}$.

13. The optical waveguide of claim 1 wherein $K^{30}$, $Rb^+$ or both $K^+$ and $Rb^+$ ions of the substrate have been replaced by (i) $NH_4^+$ and (ii)$Ba^{+2}$.

14. The optical waveguide of claim 1 wherein $K^+$, $Rb^+$ or both $K^+$ and $Rb^+$ ions of the substrate have been replaced by at least one monovalent ion selected from the group consisting of $Rb^+$, $Cs^+$ and $Tl^+$.

15. The optical waveguide of claim 1 wherein $K^+$, $Rb^+$ or both $K^+$ and $Rb^+$ ions of the substrate have been replaced by at least one divalent ion selected from the group consisting of $Ba^{+2}$, $Cs^{+2}$ and $Pb^{+2}$.

16. The optical waveguide of claim 1 wherein $K^+$, $Rb^+$ or both $K^+$ and $Rb^+$ ions of the substrate have been replaced by $NH_4^+$ in the presence of ammonia gas.

* * * * *